FLAT PACKAGE FOR SEMICONDUCTORS

Filed July 17, 1967

INVENTOR.
Charles G. Elliott
BY
Marn & Jangarathis
ATTORNEYS

INVENTOR.
Charles G. Elliott
BY
Marn & Jangarathis
ATTORNEYS 3,404,214

FLAT PACKAGE FOR SEMICONDUCTORS

Charles G. Elliott, Setauket, N.Y., assignor to Alloys Unlimited, Inc., Melville, N.Y.

Filed July 17, 1967, Ser. No. 653,931
6 Claims. (Cl. 174—52)

ABSTRACT OF THE DISCLOSURE

Square or rectangular flat packages which can be inverted and bonded directly to printed circuit boards and the like (often called "flip packages") without external wire connections are described in applicant's U.S. Patent No. 3,271,507. By means of grooves and selective unmetallized sections which define discrete conductive areas, all connections to the semiconductive device are made within the package. It has now been discovered that by changing the basic package configuration from square to round, and making the packages somewhat larger, substantial cost advantages are obtained. These packages embrace a novel design which has many applications where space is not such a limiting factor but cost is. Advantages of this new design to the manufacturer include elimination of the grooving step and simplification of metallizing and other procedures. Advantages to the user include adaptability to automatic handling equipment and greater freedom in circuit design.

*Background of the invention*

*Field of the invention.*—This invention relates generally to structures or packages on which small semiconductor elements are mounted and, more particularly, the invention relates to semiconductor packages in which all circuit connections to terminals are enclosed within the package, with only the terminals exposed. The novel package of the invention is preferably mounted terminal-side down, i.e., inverted, on a circuit board with the terminals in direct contact with other circuit elements or conductors.

The very small size of semiconductor elements makes the connection of wires thereto, referred to as ohmic contact, a difficult task. For example, networks which are complete circuit configurations are fabricated from a single semiconductor wafer, the various elements such as resistances, capacitances and amplifying devices being formed by making ohmic contact at appropriate places. Thus, the semiconductive material between two ohmic contacts on the wafer may constitute a resistance, while the capacitance existing within a back-biased PN junction may be employed as capacitive element. Dual junctions, i.e., PNP and NPN junctions, may be used to form transistor amplifying elements. Often, the surface of the wafer is etched in various configurations to form desired circuit components. When it is considered that the wafer may be no bigger than the head of a pin and only 0.005 in. thick, the magnitude of handling and assembly problems becomes apparent.

*Prior art.*—The problem of containing all ohmic contacts within a package which can then be inverted and mounted on a printed circuit board, hybrid integrated circuit or the like is effectively overcome by the package design described and claimed in my prior U.S. Patent No. 3,271,507. As a proper understanding of the present invention requires that the packages described in said patent be clearly visualized, a drawing of a patented package is included in the annexed drawings as FIGURE 1, and the general structure and manufacturing technique therefor are described briefly hereinbelow.

With reference to FIGURE 1, the package 10 is seen to comprise a ceramic body 12 having a central channel section 14, a first raised end section 16 adjacent channel section 14, and a second raised end section 18 separated from channel section 14 by a step section 20 of intermediate height. Step section 20 has a horizontal "tread" surface 22 and a vertical "riser" surface 24. A vertical groove 26 bisects end section 18 and step section 20, extending below the level of tread surface 22. Metallizing (and plating) is applied to all top and interior surfaces with the exception of riser surface 24. The effect of this selective metallizing and plating is to provide a first continuous conductive coating from the channel section surface to the top surface of adjacent end section 16, and two discrete conductive coatings from tread surface 21 to the top of adjacent end section 18. Electrical isolation between the three conductive coatings is provided by groove 26 and riser surface 24.

A semiconductive device 27 is bonded to the surface of channel section 14, and ohmic contact is made thereto with wires 28 which are then bonded to the separate tread surfaces. The device is potted with epoxy or the like, leaving only the three top surfaces exposed. In the embodiment shown, device 27 is typically a transistor and the three top surfaces form base, emitter and collector contacts. The device is then inverted and bonded to corresponding contact pads on the printed circuit board, hybrid integrated circuit or the like.

The above description relates to a relatively simple embodiment. Other embodiments include multiple grooves of varying depth, two step sections and the like. The procedures for manufacturing these packages will now be described.

A variety of dielectric materials can be used to form the substrates, but ceramics are preferred and high purity alpha alumina is the material of choice. It is necessary that a suitable grain-size distribution of the alumina particles be obtained, so that the packages will be sufficiently dense. The blend ranges from —48 mesh to —325 mesh. The sized particles are mixed with water and suitable binders, and formed into elongated blanks having the cross-section of the finished package. The forming operation is generally done on presses with hard-finished dies, but extrusion is also possible.

The next two operations are metallizing and firing, and there are known techniques for performing either operation first (i.e., metallizing can be done with the substrate in the green or fired state). Metallizing can be done in a variety of ways. Spraying of the metal from a suspension with a volatile liquid carrier is preferred. For spraying, a large number of blanks are close-packed in a tray and the entire top surface is sprayed, the close packing preventing any metallizing from depositing on the sides of the blank. After drying, the operation can be repeated as necessary. Firing is carried out in a suitable kiln using well-known techniques.

After firing and metallizing, the metallizing is removed from surfaces where it is not desired, i.e., the riser surface of the step sections. The packages are then gold plated by electrolytic techniques, the gold of course adhering only to the metallized surfaces. The blanks are now ready to be grooved and cut into individual packages.

Diamond wheels are necessary to cut the fired ceramic. Gangs of such wheels, appropriately spaced and at a set height, do the grooving. The blanks are close-packed, side by side, on an open-ended tray and passed beneath the wheels. If a groove is to be cut along the length of the channel section a second operation is necessary. A similar gang of wheels cuts the blank into individual packages.

While packages are successfully produced in large quantities in the foregoing manner, plating is expensive because, due to their small size, a long plating cycle is necessary to make sufficient contacts. The grooving and cutting with diamond wheels adds considerably to the expense and, if not done with high precision, can ruin a batch of packages. Also, care must be taken to maintain the original strip of packages absolutely flat; any "bowing" will result in rejects.

A problem of large-scale usage of these packages is that, once they are loaded, potted and inverted, there is no way for an automatic machine to discriminate between the collector and base-emitter sides, which means that they must be hand loaded if automatic equipment is to be used. Also, the extremely close spacing of the contact surfaces, separated only by the narrow grooves, limits the circuit designer in his lead placement and not infrequently necessitates the use of cross-overs.

*Objects of the invention*

The foregoing problems are all related to the very small size and complex design of the patented packages. It is a general object of the present invention to provide a novel package design for applications where space is not a critical element and which is more economical to produce by virtue of eliminating the above-enumerated problems.

Another object of the invention is to provide a flat package for semiconductive devices which is easier and simpler to manufacture than devices heretofore available.

Still another object of the invention is to provide a flat package for semiconductive devices which is more convenient to install and use than devices heretofore available.

Yet another object of the invention is to provide a flat package for semiconductive devices adapted for high volume, low cost production.

Yet another object of the invention is to provide an improved, versatile, flat semiconductor package design suitable for a large number of ohmic contact arrangements.

Still another object of the invention is to provide a flat package for semiconductors which does not require grooving or diamond wheel cutting.

A still further object of the invention is to provide a flat, flip package for semiconductors which is adapted for automatic positioning in loading equipment.

Another object of the invention is to provide a flat, flip package for semiconductors with greater spacing between contacts than in packages heretofore available.

Various other objects and advantages of the invention will become clear from the following description of several embodiments thereof, and the novel features will be particularly pointed out in connection with the appended claims.

*Summary of the invention*

The packages of the present invention have a basically round configuration, and electrical isolation between contacts is on a horizontal, rather than a vertical, surface. Briefly, the package comprises a dielectric body having on its upper surface a circular central, depressed section, and on the outer periphery of the upper surface there are a plurality of raised, curved contact sections. In one embodiment, there are three such contact sections, one of which is much larger than the other two. The package is provided with straight sides between the curved contact sections. A conductive coating is applied to the surfaces of the depressed section, across a portion of the upper surface and on the inside and top surfaces of the larger of the contact sections. This forms the collector contact. Other conductive coatings are applied on the top and inside surfaces of the other contact sections and across a portion only of the adjoining upper surface. These coatings are for base and emitter contacts. This embodiment has several advantages. It is pressed to its final physical form in a single operation and requires no grooving or other operation to isolate discrete conductive areas. The metallizing is readily applied selectively through an appropriate mask, and no removal of metallizing from selected areas is thereafter required.

Because electrical isolation of the base and emitter contacts is on the horizontal upper surface of the body, masking is simplified. Because of the straight sides between the contact sections and larger collector contact, the device can be automatically oriented in loading and bonding equipment. Further, the circular outline of the contact areas allows the circuit designer greater freedom in positioning contact pads and other circuit elements. In the three-contact embodiment described above, there is substantially more space between the contact areas than in packages heretofore available, which allows the circuit designer to place conductive paths between or around the contact paths, thus minimizing cross-over problems.

*Brief description of drawings*

Understanding of the invention will be facilitated by referring to the following detailed description thereof in conjunction with the accompanying drawings, wherein.

*Description of embodiments*

Figures 1, 2, 3, 4, 5, 6:
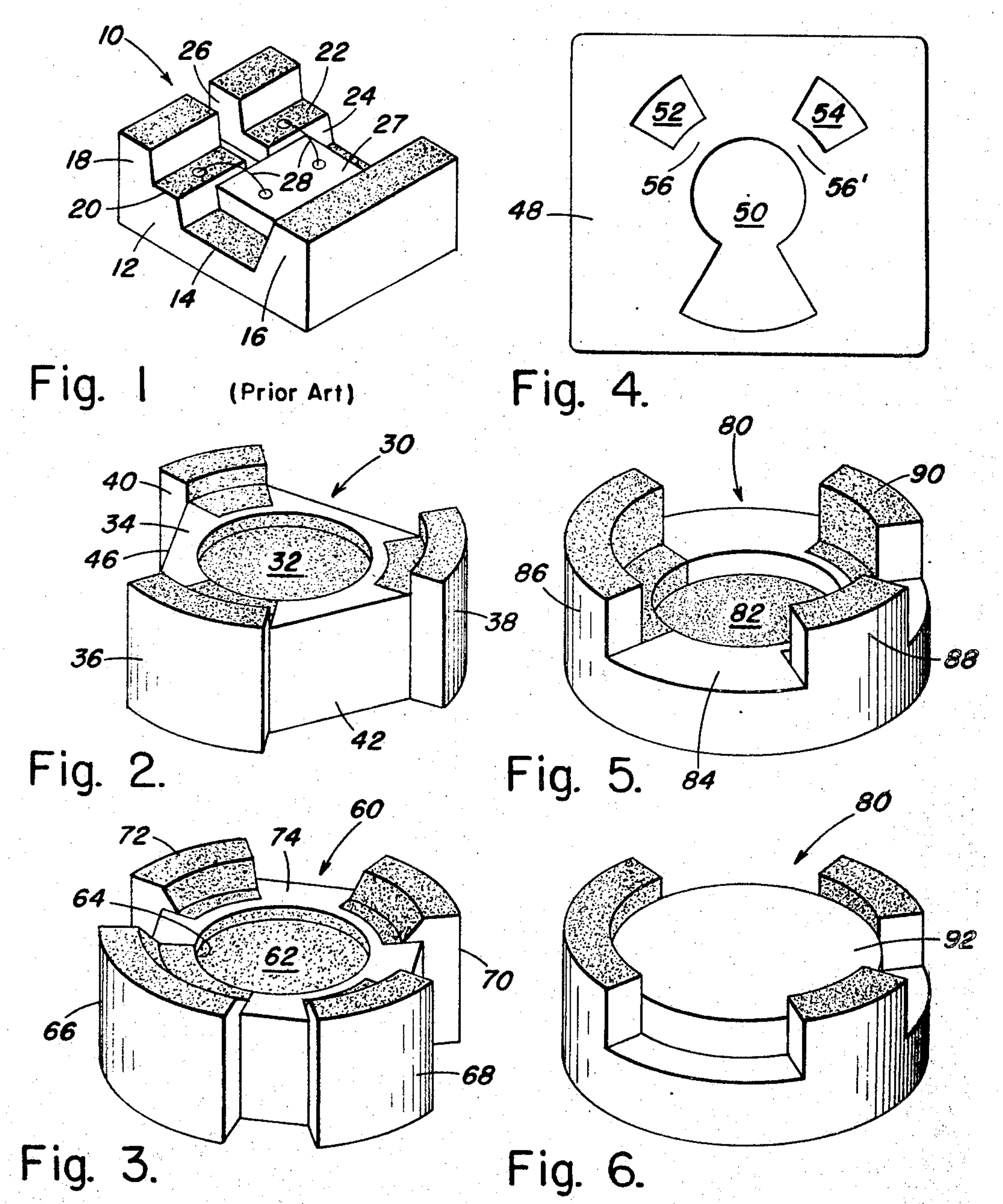
FIGURE 1 is a perspective view of a flat package according to my aforementioned prior U.S. patent.
FIGURE 2 is a perspective view of an embodiment of the present invention.
FIGURE 3 is a perspective view of an embodiment of the invention similar to FIGURE 2, but having four contact pads.
FIGURE 4 is a plan view of a metal mask useful in producing the embodiment of FIGURE 2.
FIGURE 5 is a perspective view of an alternative embodiment of the invention.
FIGURE 6 is a perspective view of the embodiment of FIGURE 5 after sealing.

A transistor package in accordance with the invention is illustrated in FIGURE 2. The ceramic body 30 is, generally, alumina, but may be made of essentially any dielectric material. For example, beryllia may be employed where better heat dissipation is required. In other applications, plastics are satisfactory. Preferably, body 30 is pressed from alumina powder in a die adapted to form a central recessed, circular section 32 in the top surface 34. At the outer periphery of body 30 there are three, spaced, raised contact sections 36, 38, and 40. Each of these contact sections has a generally arcuate configuration when viewed from above, but the sides 42, 44, 46 of body 30 therebetween are preferably straight. Contact section 36 forms the collector contact and is about twice as long as sections 38 or 40. This feature, combined with the straight sides 42, 44, 46, makes the orientation of the contacts immediately apparent when the package is inverted.

After the body 30 is pressed to shape it is fired to a rigid ceramic in accordance with known procedures.

While the dimensions of body 30 are varied for individual applications, they are generally very small and, so that a better understanding of the invention may be obtained, the dimensions of a typical package of the type illustrated in FIGURE 2 are listed below:

| | Inches |
|---|---|
| Overall diameter | 0.132 |
| Overall height | 0.060 |
| Central recess | 0.060 x 0.008 |
| Base and emitter sections | 0.040 x 0.012 |
| Collector section | 0.070 x 0.012 |
| Distance between sections (minimum) | 0.060 |

After firing, body is metallized on selected surfaces, and for this purpose a metal mask such as is shown in FIGURE 4 may be used. Mask 48 is provided with three apertures 50, 52, 54. Aperture 50 is shaped to fit slidably over collector contact section 36 and conform to central recessed section 32, as well as the area therebetween. Broadly, it is of a general "keyhole" configuration. Apertures 52, 54 are the same and are adapted to fit slidably over base and emitter contact sections 38, 40 and a portion only of top surface 34 adjacent thereto. The spaces 56, 56' between the inner edges of apertures 52, 54 and the outer edge of the circular portion of aperture 50 define the isolation path which prevents the contacts from shorting.

Mask 48 (which in practice contains apertures for a large number of devices) is placed over body 30 as described above and a metallizing solution is sprayed thereon through the apertures. Surfaces covered with metallizing are the top and inside surfaces of each of the contact sections 36, 38, 40, the bottom and sides of central recess 32 and the selected portions of top surface 34 adjacent the contact sections which are exposed by the mask. If some metallizing is applied to the sides or back of the contact sections it is of no consequence. However, this does not generally occur since the mask will usually be almost as thick as the distance from the top of upper surface 34 to the top of the contact sections (0.012 in, in the package dimensioned above).

After the metallizing coating dries, one or more additional coatings may be applied as desired. Conventional metallizing compositions, such as molybdenum-titanium powders suspended in a suitable solvent, are employed.

Since the metallizing spray is applied from a nozzle or spray head located above the masked devices, a lesser amount thereof is likely to be deposited on the unmasked vertical surfaces than on the horizontal surfaces. This problem is lessened by pressing the body so as to give these surfaces a degree of slope rather than having them perfectly vertical (see FIG. 3). This in no way affects the cost or operation of the device.

After metallizing, the mask 48 is removed and the device is dried and fired by conventional means to drive off the solvent and bond the metallizing to the substrate. Typical firing conditions are 1400–1550° C. in wet hydrogen, the latter preventing oxidation of the coating.

Manufacture of the package is completed by plating a continuous metallic coating on the metallized areas. Again, conventional techniques and materials are employed. Typically, barrel electroplating equipment is used and an initial layer of nickel is covered by about 200 microinches of gold. Of course, other materials, techniques and thicknesses may be employed.

The complete package is now ready for bonding of the semiconductive device thereto, making of ohmic contact to base and emitter contact sections, potting and installation. Procedures followed are substantially the same as described in my above mentioned prior patent, but as noted, the packages of the present invention are adapted for handling in automatic equipment.

In FIGURE 3 there is illustrated a package in accordance with the invention having four raised contact sections spaced around the periphery and wherein the inside surfaces of the contact sections and the "riser" surface surrounding the central recess are sloped for easier metallizing. In particular, ceramic body 60 has, on its upper surface, a circular, central depressed section 62 having a sloped sidewall 64. Four contact section 66, 68, 70, 72 are spaced around the periphery of body 60 with their top surfaces raised above the upper surface 74 of body 60, and having sloping walls therebetween. The upper surfaces of the contact sections have a generally arcurate configuration and the sides of body 60 therebetween are straight. One contact section 66 is substantially larger than the others. A first continuous conductive coating (metallizing plus plating) is applied on the bottom 62 and sides 64 of the central recess, the top and inside (sloping) surface of contact section 66, and the portion of upper surface 74 therebetween. Other continuous conductive coatings are applied to the top and inside surfaces of the other contact sections and a portion only of surface 74 adjacent to each. Manufacture, installation and use of this package is essentially the same as described in connection with the embodiment of FIGURE 2.

FIGURES 5 and 6 illustrate a completely round embodiment of the invention particularly adapted for hermetic sealing of the semiconductive device. In this embodiment, the body 80 is entirely round, and has a circular, central depressed section 82 on the top surface 84 thereof, and three raised contact sections 86, 88, 90 extending upwardly from surface 84 rather than being located on the periphery or sides of the body as in previous embodiments. Metallizing and plating are applied in substantially the same pattern as described in connection with the embodiment of FIGURE 2. The same package is shown in FIGURE 6 after loading with a semiconductive device and a glassed ceramic lid 92, which provides a completely hermetic seal.

Figure 7:
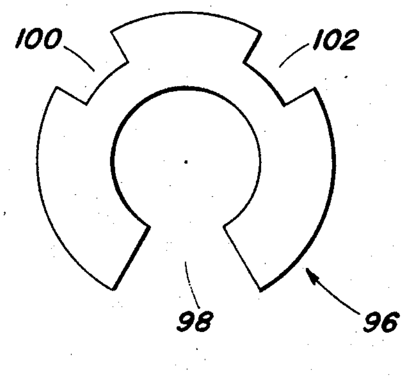
FIGURE 7 is a plan view of a metal mask adapted for high-volume production.

It will be noted that the mask illustrated in FIGURE 4 requires that each device be loaded therein prior to metallizing, which is a labor-intensive procedure. Commonly, such a mask will be etched to close tolerances and be used for relatively short production runs of special designs. In FIGURE 7 there is illustrated a mask that can be simply manufactured from thin sheet stock by stamping, can be automatically shake-loaded into individual packages and, because of its low cost, can be discarded after a single use. In essence, the mask 96 of FIGURE 7 is an exact replica of the electrical isolation path desired on the upper surface of the package. A "keyhole" opening or slot 98 conforms to the central depressed section, the collector contact section, and the surface therebetween. Two other openings or slots 100, 102 conform to the base and emitter contact sections and a portion of the adjacent upper surface of the body. Dimensional tolerances on such a stamping need not be particularly close; as long as the mask is correctly loaded electrical isolation will be achieved.

Figures 8, 10:
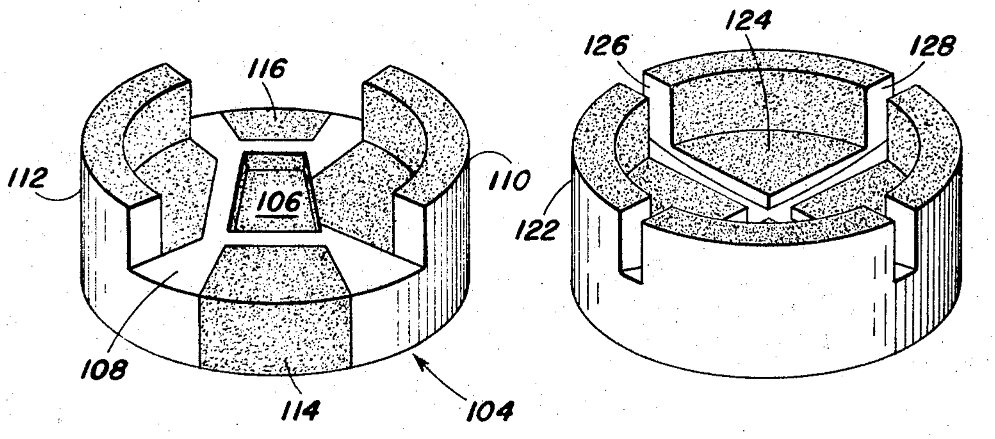
FIGURE 8 is a perspective view of an embodiment of the invention having a grounded emitter.
FIGURE 10 is a perspective view of an embodiment of the invention particularly adapted for use as a package for a silicon-controlled switch.

In many applications one of the contacts to the device is desired to be grounded, and an embodiment of the invention particularly adapted for this service is illustrated in FIGURE 8. The body 104 has a round configuration and is provided with a square or rectangular depressed section 106 centrally located on its upper surface 108. A raised collector contact section 110 is provided on one side of the device having a continuous conductive coating extending from its top surface to the bottom surface of section 106 and the surfaces therebetween. A raised base contact section 112 is provided in a position diametrically opposed to section 110, and has a continuous conductive coating on its top and inside surfaces and a portion only of adjacent upper surface 108. Two grounded emitter contacts 114, 116 are provided but, contrary to previous embodiments, these are not on raised contact sections but, rather, continuous conductive coatings applied to portions of upper surface 108, the sides of body 104 and over onto the undersurface thereof. In use, the device is bonded to the bottom surface 106, and ohmic contact is made from the base area to the adjoining conductive coating adjacent section 112. A metal "strap" is then bonded across the device and to emitter contacts 114, 116. The ground connection is made to the undersurface of body 104 upon installation of the completed (potted or lid-sealed) device.

Figure 9:
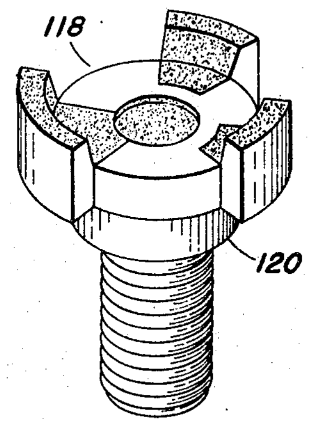
FIGURE 9 is a perspective view of the embodiment of FIGURE 2 stud mounted as a high frequency strip line package.

As noted hereinabove, the packages of the present invention are designed generally for inverted mounting, but this is not necessary. The embodiment of FIGURE 8 may, for instance, be mounted in the upright position on a grounding strip. In certain applications stud mounting is preferred, and this is ilustrated in FIGURE 9. This drawing shows a high frequency strip line package 118 mounted on a threaded copper stud 120. As in such installations heat dissipation is usually a factor to be reckoned with, beryllia is the material of choice for package 118. The package is of generally similar design to the previously described embodiments, but in this instance the undersurface of the package is metallized and plated for bonding to stud 120. If the grounding of a contact to stud 120 is desired, the conductive coating can be extended over the outside surface of the appropriate contact section or, alternatively, a package such as is shown in FIGURE 8 may be employed.

All of the previously described embodiments of the invention have completely avoided the grooving operations necessary for the patented packages described hereinabove. In one particular embodiment of the invention, however, grooving is employed, and this is illustrated in FIGURE 10. This embodiment is particularly adapted for containing a silicon-controlled switch wherein the active semiconductive element is provided with four bumps or projections on one side to which contact must be made. The dielectric body 122 is pressed in the simple shape of a round plinth having a central, circular depression 124 in its upper surface, with straight or sloped inner sidewalls. After firing, the entire upper surfaces, i.e., the top surface and the side and bottom surfaces of depression 124, are metallized. It will be appreciated that this can be done without a mask of any sort. After the metallizing has been fired on, two transverse grooves 126, 128 are cut at right angles to each other to a depth which extends below the bottom of depression 124, thereby dividing the metallized surfaces of the body into four discrete metallized areas. The body is thereafter plated. The aforementioned silicon device is then inverted and bonded to the bottom surface of depression 124, one contact projection being bonded to each of the discrete conductive areas formed by grooves 126, 128. The package is thereafter potted with epoxy (or sealed with a lid) and is ready for installation. While manufacture of this device does involve a grooving step, it has all the other advantages of the invention.

Generally speaking, the packages of the present invention are particularly suited for high-volume, low cost application, where space is not particularly at a premium, in which discrete semiconductive devices are employed. Commercial television, radio and communications equipment are typical examples. Where space is at a substantial premium, as in many military and space applications, the packages described in my aforementioned U.S. patent are preferred. The low cost of the packages of the present invention results from the following factors. They are pressed initially to final shape, so bowing problems are eliminated. Due to their larger size and simplified design, dimensional tolerances are not as demanding, masking is a simple process, and plating cycles are shorter. With the exception of the FIGURE 10 embodiment, grinding, grooving and cutting operations are eliminated. Their ability to be handled by automatic equipment simplifies manufacturing, loading and installation.

It is to be understood that the packages of the invention can also be attached to ribbon lead preforms and sealed with a lid, low temperature sodium borate glass, for example, being used as a sealant. Also, while it is simpler to metallize the entire surface of the depressed section, both bottom and sides, a more elaborate mask could be used to coat merely the bottom and that portion of the side leading to the collector contact. Various other changes in the details, steps, materials and arrangements of parts, which have been herein described and illustrated in order to explain the nature of the invention, may be made by those skilled in the art within the principle and scope of the invention as defined in the appended claims.

What is claimed is:

1. A package structure for containing semiconductive elements comprising:
   - an insulating dielectric body having horizontal upper and lower surfaces;
   - a central, depressed section in the upper surface of said body adapted to receive said semiconductive element;
   - a plurality of raised contact sections extending above said upper surface and spaced from said depressed section and from each other;
   - a first continuous conductive coating covering the surfaces of said depressed section, the top and inside surfaces of one of said contact sections, and the portion of said horizontal upper surface therebetween;
   - additional continuous conductive coatings covering the top and inside surfaces of the remaining contact sections and a portion only of said surface adjacent thereto; and
   - an electrical isolation path on said horizontal upper surface comprising the uncoated portions thereof between said continuous conductive coatings.

2. The structure as claimed in claim 1, wherein said one of said contact sections is of a substantially larger size than said remaining contact sections.

3. The structure as claimed in claim 2, wherein said contact sections have an arcurate configuration when viewed from above and are arcurately disposed around said depressed section.

4. The structure as claimed in claim 3, wherein said contact sections are located substantially on the outer periphery of said body extending radially therebeyond, and extend to the lower surface of said body.

5. The structure as claimed in claim 1, and additionally comprising an additional continuous conductive coating on the lower surface of said body, a portion of the side of said body and a portion of the upper surface of said body, said coating on said upper surface being spaced from said other coatings.

6. The structure as claimed in claim 1, wherein one of said continuous conductive coatings extends from the top surface of said contact section over the outside thereof and onto the lower surface of said body.

References Cited

UNITED STATES PATENTS

| | | | |
|---|---|---|---|
| 2,880,383 | 3/1959 | Taylor | 317—234 |
| 3,271,507 | 9/1966 | Elliott | 174—52 |

DARRELL L. CLAY, *Primary Examiner.*